United States Patent
Degoul et al.

(10) Patent No.: US 7,850,254 B2
(45) Date of Patent: Dec. 14, 2010

(54) EXTREME EMERGENCY BRAKING SYSTEMS FOR BRAKE-BY-WIRE BRAKE SYSTEMS

(75) Inventors: Paul M. Degoul, Paris (FR); Jean-Francois M. Larroux, Vincennes (FR); Robert J. Disser, Dayton, OH (US)

(73) Assignee: BWI Company Limited S.A., Luxembourg (LU)

( * ) Notice: Subject to any disclaimer, the term of this patent is extended or adjusted under 35 U.S.C. 154(b) by 968 days.

(21) Appl. No.: 11/708,241

(22) Filed: Feb. 20, 2007

(65) Prior Publication Data

US 2008/0197696 A1     Aug. 21, 2008

(51) Int. Cl.
*B60T 8/88* (2006.01)
(52) U.S. Cl. .......................... 303/122; 701/76
(58) Field of Classification Search ................. 303/122, 303/122.03, 122.04, 20, 22.4; 701/70, 71, 701/76
See application file for complete search history.

(56) References Cited

U.S. PATENT DOCUMENTS

| | | | | |
|---|---|---|---|---|
| 6,317,675 | B1 * | 11/2001 | Stolzl et al. | 701/76 |
| 6,663,195 | B1 * | 12/2003 | Arnold | 303/122.03 |
| 6,820,946 | B2 * | 11/2004 | Salamat et al. | 303/122.09 |
| 2004/0015281 | A1 * | 1/2004 | Weiberle | 701/70 |

FOREIGN PATENT DOCUMENTS

KR     2010039644 A  *  4/2010

* cited by examiner

*Primary Examiner*—Pam Rodriguez
(74) *Attorney, Agent, or Firm*—Dickinson Wright PLLC (57) ABSTRACT

An extreme emergency braking system including at least two brake modules, a pedal feel emulator in communication with at least one of the brake modules by way of a first communication line, an electric park brake switch assembly in communication with the brake modules by at least a second communication line, and an electric circuit adapted to supply at least a first voltage to a first one of the brake modules and a second voltage to a second one of the brake modules, the supplied voltages being indicative of a state of the switch assembly, wherein the first communication line is independent of the second communication line.

24 Claims, 5 Drawing Sheets

EXTREME EMERGENCY BRAKING SYSTEMS FOR BRAKE-BY-WIRE BRAKE SYSTEMS

BACKGROUND

The present application relates to brake-by-wire brake systems and, more particularly, to extreme emergency braking systems for brake-by-wire brake systems.

Government regulations often require vehicles employing conventional hydraulic brake systems to include at least two independent brake commands: a nominal brake command and a park brake command. The nominal brake command typically is associated with the normal pedal-based brake function or other traditional downgrade modes. The park brake command typically is associated with a hand brake lever or the like for providing continuous braking when the vehicle is parked and, in the event of a severe fault with the nominal brake command, may be employed to provided extreme emergency braking when the vehicle is in motion.

Brake-by-wire brake systems have been developed to replace traditional hydraulic brake systems with brake systems employing an electrical connection, rather than the traditional hydraulic connection, between the user's brake input and the brake unit. Brake-by-wire brake systems have been employed in both nominal brake command systems and park brake command systems.

Brake-by-wire brake systems typically employ numerous redundant systems and components to ensure proper operation in response to a nominal brake command in the event of an electrical failure in the system. Nonetheless, there remains a possibility that the nominal system may fail.

Accordingly, there is a need for a brake-by-wire brake system having a nominal brake command system independent of the park brake command system such that the park brake command system may be used for extreme emergency braking.

SUMMARY

In one aspect, the disclosed extreme emergency braking system may include at least two brake modules, a pedal feel emulator in communication with at least one of the brake modules by way of a first communication line, an electric park brake switch assembly in communication with the brake modules by at least a second communication line, and an electric circuit adapted to supply at least a first voltage to a first one of the brake modules and a second voltage to a second one of the brake modules, the supplied voltages being indicative of a state of the switch assembly, the secondary communication lines, and the related electronics in brake modules, wherein the first communication line is independent of the second communication line.

In another aspect, the disclosed extreme emergency braking system may include a vehicle including four wheels, each of said four wheels including a brake module associated therewith, a pedal feel emulator in electrical communication with each of the four brake modules over a time-triggered communication bus, the pedal feel emulator including a brake pedal having sensors (e.g., a force sensor or displacement sensor) connected thereto, wherein the sensors are adapted to sense a nominal braking command and communicate the nominal braking command to the four brake modules, and an electric park brake switch in communication with at least one of the four brake modules by way of hard-wired communication lines or an event-triggered communication bus, wherein the electric park brake switch is adapted to sense a park brake command and communicate the park brake command to at least one of the four brake modules.

Other aspects of the disclosed extreme emergency brake system will become apparent from the following description, the accompanying drawings and the appended claims.

DETAILED DESCRIPTION

Figure 1:
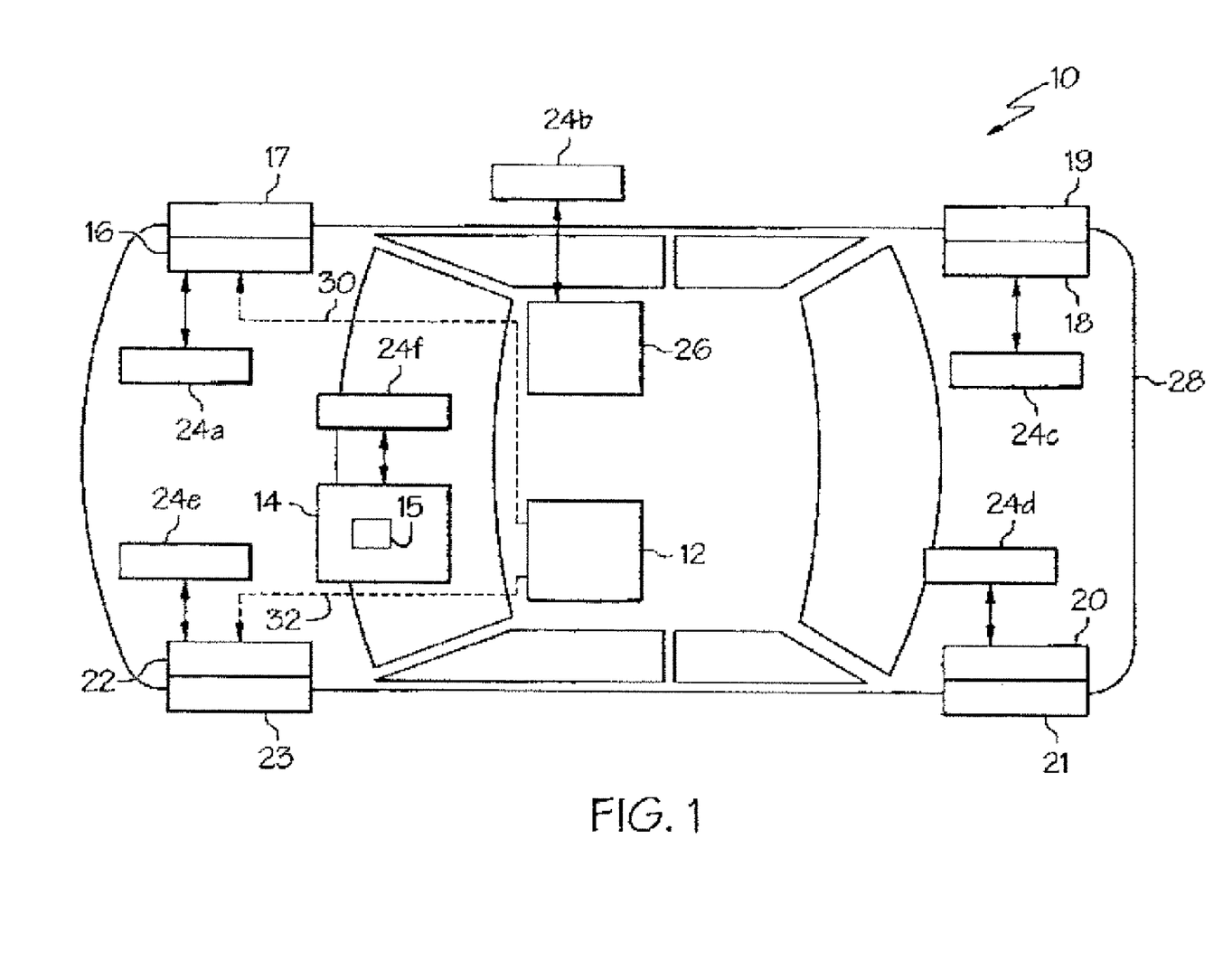
FIG. 1 is a schematic illustration of one aspect of the disclosed extreme emergency brake system.

As shown in FIG. 1, one aspect of the disclosed extreme emergency brake system, generally designated 10, may include an electric park brake switch assembly 12, a pedal feel emulator 14, four brake modules 16 (i.e., right-front), 18 (i.e., right-rear), 20 (i.e., left-rear), 22 (i.e., left-front), a communication bus 24*a*, 24*b*, 24*c*, 24*d*, 24*e*, 24*f* (collectively, 24) and, optionally, a vehicle dynamic module 26. The system 10 may be embodied on a vehicle 28, such as a passenger car, a truck or the like, having wheels 17, 19, 21, 23.

The pedal feel emulator 14 may be any device capable of receiving a user input (e.g., a braking command) and communicating the user input to one or more of the brake modules 16, 18, 20, 22 and/or, optionally, to the vehicle dynamic module 26 over the communication bus 24. In one aspect, the pedal feel emulator 14 may resemble a traditional brake pedal and may provide a user with the feel of a traditional hydraulic brake pedal (e.g., non-linear pedal travel versus pedal force) in response to the user's brake command. In another aspect, the pedal feel emulator 14 may include a brake pedal (not shown) (e.g., a cantilevered brake pedal) and one or more sensors 15 (e.g., force sensors and/or displacement sensors) connected to the brake pedal, wherein the sensor is adapted to monitor the request applied to the brake pedal by the user. However, those skilled in the art will appreciate that any device capable of receiving and/or communicating a user's brake command may be employed as the pedal feel emulator 14.

The communication bus 24 may be any communication bus capable of providing a communication link between the various nominal braking components (e.g., the pedal feel emulator 14, the brake modules 16, 18, 20, 22 and the vehicle dynamic module 26) of the system 10. For example, the communication bus 24 may be a time-triggered communication bus, such as a FLEXRAY® bus, a TTP/C bus or the like, for providing high baudrate communication and tight synchronization of the components of the system 10. However, those skilled in the art will appreciate that the communication bus 24 may be replaced with and, therefore, is intended to include any communication means, such as hard-wired communication lines, wireless communications lines or the like, wherein "hard-wired communication lines" is intended to broadly include wired communication buses, hard-wired signals and the like.

The brake modules 16, 18, 20, 22 may be any brake units capable of receiving an electronic or other brake-by-wire braking command and generating a braking force in response thereto. For example, one or more of the brake modules 16, 18, 20, 22 may be an electric caliper, which may include an electric motor adapted to drive a piston/caliper or other mechanical component into engagement with brake pads to clamp a rotor positioned between the brake pads. Alternatively, one or more of the brake modules 16, 18, 20, 22 may be an electro-hydraulic brake unit, wherein an electric motor may be used to pressurize hydraulic fluid, which in turn actuates brakes unit to supply a braking force.

The vehicle dynamic module 26 may be in communication with the pedal feel emulator 14 and/or the brake modules 16, 18, 20, 22 over the communication bus 24. In one aspect, the vehicle dynamic module 26 may be an electronic control unit adapted to receive user braking commands from the pedal feel emulator 14 and/or various other inputs from sensors and/or other electronic control units on the vehicle 28 and may facilitate various high-level functions, such as anti-lock braking, traction control and vehicle stability enhancement. For example, the vehicle dynamic module 26 may generate and/or communicate an anti-lock braking command to one or more of the brake modules 16, 18, 20, 22 based upon a user input signal received from the pedal feel emulator 14 and wheel speed sensors (not shown) optionally located at each corner of the vehicle 28.

As shown in FIG. 1, the electric park brake switch 12 may be connected to the right-front brake module 16 by communication line 30 and the left-front brake module 22 by communication line 32. Communication lines 30, 32 may be hard-wired communications lines, wireless communications lines or the like.

Figure 4:
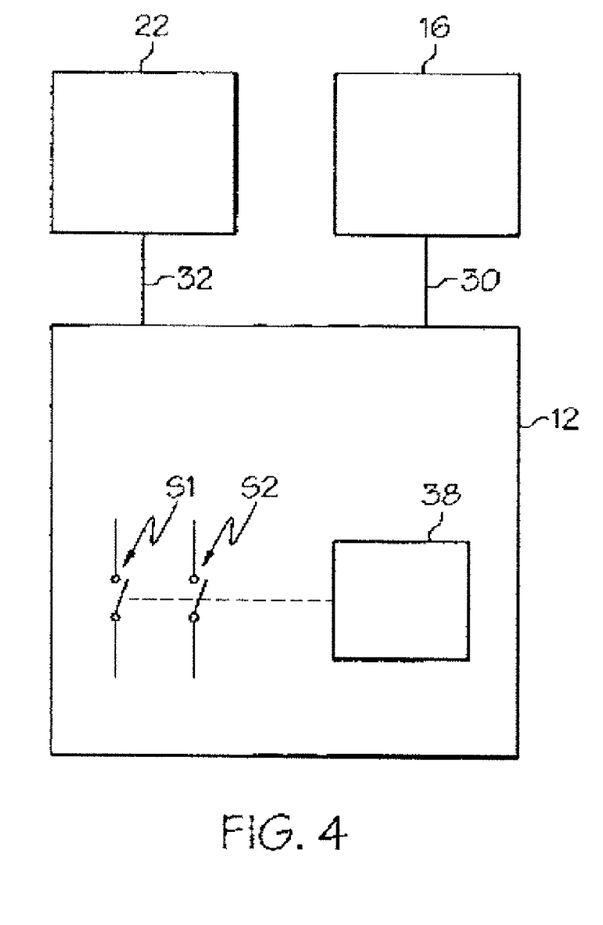
FIG. 4 is a block diagram of one aspect of an electric park brake switch of the extreme emergency brake system of FIG. 1.

The electric park brake switch 12 may be any switch or device capable of communicating a park brake command to one or more of the brake modules 16, 18, 20, 22. In FIG. 1, the electric park brake switch 12 is only connected to brake modules 16, 22. Referring to FIG. 4, in one aspect, the electric park brake switch 12 may be a double-contact switch including a first switch S1 and a second switch S2, wherein the switches S1, S2 are associated with a fault detecting electric circuit 38 adapted to facilitate early detection and diagnosis of faults within the system 10, such as switch failures and open or short circuits on the communication lines 30, 32 between the brake modules 16, 22 and the switch 12.

Referring to FIG. 4, the electric park brake switch 12 may facilitate multiplexing more than 2 switch states. For example, assuming that the top of switch S1 is connected to brake module 22 by wire 32, the top of switch S2 is connected to brake module 16 by wire 30, and the bottom of both switches S1, S2 are connected to ground G (see FIG. 5). Also, assuming that each brake module 16, 22 has a corresponding pull up resistor for the respective switch, and switches S1, S2 are not associated with a fault detecting electric circuit 38. This assumed connection provides each brake module 16, 22 with a 2 state view of the respective switch. In this case, brake module 22 may determine that switch S1 is open because the voltage on wire 32 is high and can determine that switch S2 is closed because the voltage on wire 32 is low. Brake module 22 may have no information about switch S2. The state on wire 32 as viewed by brake module 22 may be high in the event that wire 32 is open between switch S1 and the brake controller even if switch S1 is closed. The state on wire 32 as viewed by brake controller 22 may be low in the event that wire 32 is shorted to ground between switch S1 and the brake controller even if switch S1 is open. This condition does not allow brake module 22 to determine the difference between normal switch S1 conditions of open/closed and the fault wire 32 conditions of open/shorted to ground G. A similar condition exists with switch S2, brake module 16 and wire 30.

Thus, there is a need for the fault detecting electric circuit 38 which allows more that 2 states to be multiplexed onto wires 30, 32. The additional states allow brake module 22 to determine the difference between normal switch S1 conditions of open/closed and the fault wire 32 conditions of open/shorted to ground along with additional information about switch S2.

Figure 5:
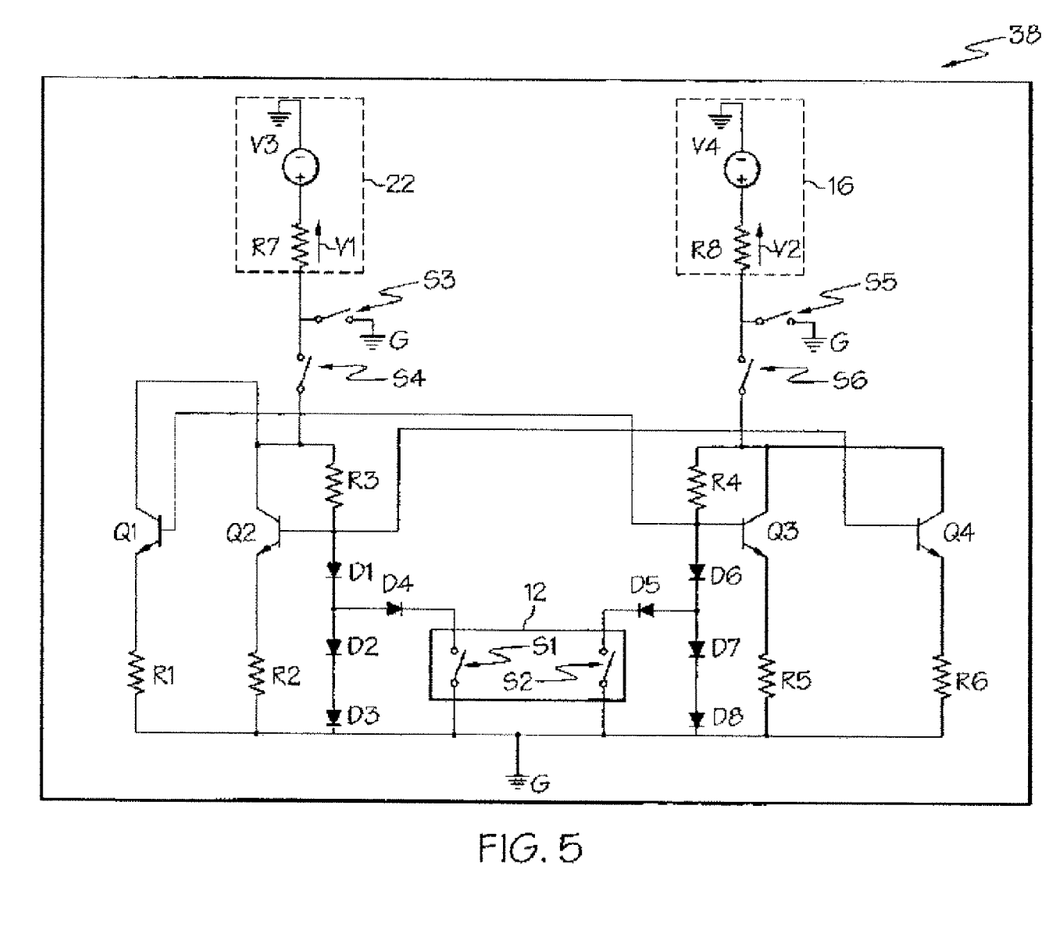
FIG. 5 is a schematic illustration of an electric circuit of the electric park brake switch of FIG. 4.

One aspect of the electric circuit 38 is schematically illustrated in FIG. 5 and may include switches S1 and S2 associated with the electric park brake switch 12, brake modules 16, 22, transistors Q1, Q2, Q3, Q4, resistors R1, R2, R3, R4, R5, R6, R7, R8 and diodes D1, D2, D3, D4, D5, D6, D7, D8. The circuit 38 may be connected to ground G, such as the chassis of the vehicle 28. Switches S3, S4, S5 and S6 may not be actual switches, but instead may be virtual switches to simulate failures.

One other aspect of the electric circuit 38 is to actually integrate switches S3, S4 in brake module 22, and switches S5, S6 in brake module 16. These switches are controlled locally by the microcontroller of the brake module in order to achieve auto-tests, for instance at system start-up. These auto-tests are particularly useful to detect any latent fault in the electrical park brake switch 12. Theses switches are then Built-In Self-Test (BIST) components.

Brake modules 16, 22, are illustrated in FIG. 5 to receive the signals generated by the electric park brake switch 12. Brake module 16 may contain regulated voltage V4 and current sense resistor R8 such that an electric park brake signal V2 may be generated across the resistor R8. Brake module 22 may contain regulated voltage V3 and current sense resistor R7 such that an electric park brake signal V1 may be generated across the resistor R7. Switches S3, S4 are illustrated in FIG. 5 to implement possible fault scenarios to open and short communication line 32. Switches S5, S6 are illustrated in FIG. 5 to implement possible fault scenarios to open and short communication line 30.

Therefore, the circuit 38 may provide different voltage levels V1, V2 to the brake modules 16, 22, wherein the different voltage levels may be linked to the states of the switches/lines and the different faults scenarios, as shown in Table 1 below:

TABLE 1

| Switch | | | | | | Voltage | | |
| --- | --- | --- | --- | --- | --- | --- | --- | --- |
| S1 | S2 | S3 | S4 | S5 | S6 | V1 | V2 | Mode |
| On | On | Off | On | Off | On | 1.6 | 1.6 | Normal mode switches closed. |
| Off | Off | Off | On | Off | On | 2.7 | 2.7 | Normal mode switches open. |
| On | Off | Off | On | Off | On | 2.2 | 2.2 | Failure of the double switch. |
| On | On | Off | Off | Off | On | 0 | 0.5 | Broken lines to caliper. |
| Off | Off | Off | Off | Off | On | 0 | 0.5 | Broken lines to caliper. |
| On | On | On | On | Off | On | 5 | 0.3 | Wire short-cut to ground (isolation failure). |
| Off | Off | On | On | Off | On | 5 | 0.3 | Wire short-cut to ground (isolation failure). |

The circuit 38 may detect and diagnose the electric park brake switch 12 and associated components, and also the communication lines 30, 32 and the related electronics in brake modules 16 and 22, without exchanging data over the communication bus 24, thereby releasing constraints on application scheduling during the nominal brake command mode, providing an efficient consistency service for the electric park brake switch 12 in severe downgrade modes and providing consistent electric park brake switch information to the brake modules 16, 22 when the communication bus 24 is out of order.

For example, in the embodiment shown in FIG. 5, the park brake switch 12 may communicate multiple nominal mode states and multiple fault mode states of switches S1, S2 to brake modules 16, 22 over the respective single wire communication lines 30, 32 with a high level signal noise immunity enhanced by electric circuit 38. Referring to FIG. 4, switches S1, S2 may operate as a double-contact switch to provide redundant information to assist in fault detection. A valid switch operation occurs when both switches S1, S2 are open or both switches S1, S2 are closed. During nominal mode operation, switches S4, S6 are closed and switches S3, S5 are open to implement correctly connected communication lines 30, 32. During fault mode operation, switches S4, S6 may be open to implement open communication lines 30, 32. Conversely, switches S3, S5 may be closed to implement communication lines 30, 32 shorted to ground.

Referring to electric circuit 38, transistor Q1 may perform the function of multiplexing switch state information from switch S2 onto communication line 32 using a current signal controlled by resistor R1 while transistor Q2 performs the function of multiplexing switch state information from switch S1 onto communication line 32 using a current signal controlled by resistor R2. Transistor Q3 performs the function of multiplexing switch state information from switch S2 onto communication line 30 using a current signal controlled by resistor R5 while transistor Q4 performs the function of multiplexing switch state information from switch S1 onto communication line 30 using a current signal controlled by resistor R6.

During nominal mode operation with switches S1, S2 open, the bases of transistors Q1, Q3 are biased by resistor R4 from regulated voltage V4 in brake module 16 at a voltage controlled by diodes D6, D7, D8. Bias current due to resistor R4 which is detected by current sense resistor R8 is insignificant because the value of resistor R4 is large relative to the value of resistors R1, R5, and R8. Diode D6 offsets the base-emitter diode of transistors Q1, Q3. Diodes D7, D8 place a reference voltage across resistor R5 which causes transistor Q3 to multiplex a current signal onto communication line 30. Current sense resistor R8 in brake module 16 senses the current from communication line 30 and generates a portion of park brake signal V2 proportional to the reference voltage of diodes D7, D8 to indicate that switch S2 is open. Diodes D7, D8 place a reference voltage across resistor R1 which causes transistor Q1 to multiplex a current signal onto communication line 32. Current sense resistor R7 in brake module 22 senses the current from communication line 32 and generates a portion of park brake signal V1 proportional to the reference voltage of diodes D7, D8 to indicate that switch S2 is open. Additionally, the bases of transistors Q2, Q4 are biased by resistor R3 from regulated voltage V3 in brake module 22 at a voltage controlled by diodes D1, D2, D3. Bias current due to resistor R3 which is detected by current sense resistor R7 is insignificant because the value of resistor R3 is large relative to the value of resistors R2, R6, and R7. Diode D1 offsets the base-emitter diode of transistors Q2, Q4. Diodes D2, D3 place a reference voltage across resistor R2 which causes transistor Q2 to multiplex a current signal onto communication line 32. Current sense resistor R7 in brake module 22 senses the current from communication line 32 and generates a portion of park brake signal V1 proportional to the reference voltage of diodes D2, D3 to indicate that switch S1 is open. The total park brake signal V1 generated by current sense resistor R7 is proportional to the additive reference voltages generated by diodes D2, D3, D7, D8 indicating to brake module 22 that switches S1, S2 are both open. Diodes D2, D3 place a reference voltage across resistor R6 which causes transistor Q4 to multiplex a current signal onto communication line 30. Current sense resistor R8 in brake module 16 senses the current from communication line 30 and generates a portion of park brake signal V2 proportional to the reference voltage of diodes D2, D3 to indicate that switch S1 is open. The total park brake signal V2 generated by current sense resistor R8 is proportional to the additive reference voltages generated by diodes D2, D3, D7, D8 indicating to brake module 16 that switches S1, S2 are both open. In this manner, both brake modules 16, 22 are able to independently diagnose that switches S1, S2 are operating in a nominal mode of both open from the information multiplexed on the respective communication lines 32, 30 by electric circuit 38.

During nominal mode operation with switches S1, S2 closed, the bases of transistors Q1, Q3 are biased by resistor R4 from regulated voltage V4 in brake module 16 at a voltage controlled by diodes D6, D5. Bias current due to resistor R4 which is detected by current sense resistor R8 is insignificant because the value of resistor R4 is large relative to the value of resistors R1, R5, and R8. Diode D6 offsets the base-emitter diode of transistors Q1, Q3. Diode D5 places a reference voltage across resistor R5 which causes transistor Q3 to multiplex a current signal onto communication line 30. Current sense resistor R8 in brake module 16 senses the current from communication line 30 and generates a portion of park brake signal V2 proportional to the reference voltage of diode D5 to indicate that switch S2 is closed. Diode D5 places a reference voltage across resistor R1 which causes transistor Q1 to multiplex a current signal onto communication line 32. Current sense resistor R7 in brake module 22 senses the current from communication line 32 and generates a portion of park brake signal V1 proportional to the reference voltage of diode D5 to indicate that switch S2 is closed. Additionally, the bases of transistors Q2, Q4 are biased by resistor R3 from regulated voltage V3 in brake module 22 at a voltage controlled by diodes D1, D4. Bias current due to resistor R3 which is detected by current sense resistor R7 is insignificant because the value of resistor R3 is large relative to the value of resistors R2, R6, and R7. Diode D1 offsets the base-emitter diode of transistors Q2, Q4. Diode D4 places a reference voltage across resistor R2 which causes transistor Q2 to multiplex a current signal onto communication line 32. Current sense resistor R7 in brake module 22 senses the current from communication line 32 and generates a portion of park brake signal V1 proportional to the reference voltage of diode D4 to indicate that switch S1 is closed. The total park brake signal V1 generated by current sense resistor R7 is proportional to the additive reference voltages generated by diodes D4, D5 indicating to brake module 22 that switches S1, S2 are both closed. Diode D4 places a reference voltage across resistor R6 which causes transistor Q4 to multiplex a current signal onto communication line 30. Current sense resistor R8 in brake module 16 senses the current from communication line 30 and generates a portion of park brake signal V2 proportional to the reference voltage of diode D4 to indicate that switch S1 is closed. The total park brake signal V2 generated by current sense resistor R8 is proportional to the additive reference voltages generated by diodes D4, D5 indicating to brake module 16 that switches S1, S2 are both closed. In this manner, both brake modules 16, 22 are able to independently diagnose that switches S1, S2 are operating in a nominal mode of both closed from the information multiplexed on the respective communication lines 32, 30 by electric circuit 38.

During fault mode operation with switch S1 closed and switch S2 open, the bases of transistors Q1, Q3 are biased by resistor R4 from regulated voltage V4 in brake module 16 at a voltage controlled by diodes D6, D7, D8. Bias current due to resistor R4 which is detected by current sense resistor R8 is insignificant because the value of resistor R4 is large relative to the value of resistors R1, R5, and R8. Diode D6 offsets the base-emitter diode of transistors Q1, Q3. Diodes D7, D8 place a reference voltage across resistor R5 which causes transistor Q3 to multiplex a current signal onto communication line 30. Current sense resistor R8 in brake module 16 senses the current from communication line 30 and generates a portion of park brake signal V2 proportional to the reference voltage of diodes D7, D8 to indicate that switch S2 is open. Diodes D7, D8 place a reference voltage across resistor R1 which causes transistor Q1 to multiplex a current signal onto communication line 32. Current sense resistor R7 in brake module 22 senses the current from communication line 32 and generates a portion of park brake signal V1 proportional to the reference voltage of diodes D7, D8 to indicate that switch S2 is open. Additionally, the bases of transistors Q2, Q4 are biased by resistor R3 from regulated voltage V3 in brake module 22 at a voltage controlled by diodes D1, D4. Bias current due to resistor R3 which is detected by current sense resistor R7 is insignificant because the value of resistor R3 is large relative to the value of resistors R2, R6, and R7. Diode D1 offsets the base-emitter diode of transistors Q2, Q4. Diode D4 places a reference voltage across resistor R2 which causes transistor Q2 to multiplex a current signal onto communication line 32. Current sense resistor R7 in brake module 22 senses the current from communication line 32 and generates a portion of park brake signal V1 proportional to the reference voltage of diodes D4 to indicate that switch S1 is closed. The total park brake signal V1 generated by current sense resistor R7 is proportional to the additive reference voltages generated by diodes D4, D7, D8 indicating to brake module 22 that one of switches S1, S2 is open and one of switches S1, S2 is closed. Diode D4 places a reference voltage across resistor R6 which causes transistor Q4 to multiplex a current signal onto communication line 30. Current sense resistor R8 in brake module 16 senses the current from communication line 30 and generates a portion of park brake signal V2 proportional to the reference voltage of diodes D4 to indicate that switch S1 is closed. The total park brake signal V2 generated by current sense resistor R8 is proportional to the additive reference voltages generated by diodes D4, D7, D8 indicating to brake module 16 that one of switches S1, S2 is open and one of switches S1, S2 is closed. In this manner, both brake modules 16, 22 are able to independently diagnose that switches S1, S2 are operating in a fault mode of one open and one closed from the information multiplexed on the respective communication lines 32, 30 by electric circuit 38.

During fault mode operation of communication line 32 open, switch S4 is opened to simulate this condition. This fault mode of operation masks the state of switches S1, S2 such that the brake modules are not able to determine if switches S1, S2 are both open, both closed, or one open and one closed. Since communication line 32 is open, no current can flow through current sense resistor R7 in brake module 22. Therefore current sense resistor R7 generates a park brake signal V1 of zero volts. Brake module 22 diagnoses that communication line 32 is open. Since transistor Q1 has no supply voltage, the base of transistor Q3 is biased by resistor R4 from regulated voltage V4 in brake module 16 at a voltage controlled by the base-emitter of transistor Q1 and the value of resistor R1. The base-emitter of transistor Q1 offsets the base-emitter of transistor Q3. The voltage across resistor R1 becomes the reference voltage across resistor R5 which causes transistor Q3 to multiplex a current signal onto communication line 30. The base of transistor Q2 has no bias voltage and therefore does not multiplex a current signal onto communication line 30. Current sense resistor R8 in brake module 16 senses the current from communication line 30 and generates the park brake signal V2 proportional to the reference voltage across resistor R1 to indicate that communication line 32 is open. In this manner, both brake modules 16, 22 are able to independently diagnose that communication line 32 is open from the information multiplexed on the respective communication lines 32, 30 by electric circuit 38.

During fault mode operation of communication line 32 shorted to ground, switches S3, S4 are closed to simulate this condition. This fault mode of operation masks the state of switches S1, S2 such that the brake modules are not able to determine if switches S1, S2 are both open, both closed, or one open and one closed. Since communication line 32 is shorted to ground, a large current flows through current sense resistor R7 in brake module 22. Therefore current sense resistor R7 generates a park brake signal V1 equal to the maximum possible voltage. Brake module 22 diagnoses that communication line 32 is shorted to ground. Since the collector of transistor Q1 is shorted to ground, the base of transistor Q3 is biased by resistor R4 from regulated voltage V4 in brake module 16 at a voltage controlled by the base-collector of transistor Q1. The base-collector of transistor Q1 offsets the base-emitter of transistor Q3. The reference voltage across resistor R5 is the voltage drop difference between the base-collector of transistor Q1 and the base-emitter of transistor Q3 which is nearly zero volts which cause transistor Q3 to multiplex very small current signal onto communication line 30. Transistor Q1 does not multiplex a current signal onto communication line 30. Current sense resistor R8 in brake module 16 senses the current from communication line 30 and generates the park brake signal V2 which is very small to indicate that either communication line 32 is shorted to ground or communication line 30 is open. In this manner, both brake modules 16, 22 are able to independently diagnose that a communication line problem exists from the information multiplexed on the respective communication lines 32, 30 by electric circuit 38.

Those skilled in the art will appreciate that various other conditions and configurations may exist and are contemplated herein.

Thus, the circuit 38 may allow each brake module 16, 22 to read the normal states of switches S1 and S2 being both open or both closed and to read the fault states of switches S1 and S2 (e.g., one open/one closed, wires to the brake controller shorted to ground, wires to the brake controller open, etc) while providing signal noise immunity to each controller over a single wire.

Accordingly, in the nominal mode, the pedal feel emulator 14 may communicate the user's brake commands to one or more of the brake modules 16, 18, 20, 22 by way of the communication bus 24. In the park brake mode, the user may actuate the electric park brake switch 12 such that the user's command is communicated directly to the two front brake modules 16, 22 by way of the communications lines 30, 32. Furthermore, due to the independence of the nominal mode and the park brake mode, in the event of a failure in the nominal mode (e.g., a loss of the pedal feel emulator 14 or the communication bus 24), extreme emergency braking may be achieved by way of the park brake mode by actuating the electric park brake switch 12. This can be done in a consistent way on two or more brake modules because of the diagnosis capacity of the switch assembly.

In one aspect, an apply of the electric park brake switch 12 while the vehicle is moving and the pedal feel emulator 14 is released (i.e., not actuated) may achieve a progressive deceleration of the vehicle 28, which optionally may be proportional to the switch apply time. In another aspect, an apply of the electric park brake switch 12 while the vehicle is moving and the pedal feel emulator 14 is depressed (i.e., actuated) may achieve a rapid deceleration of the vehicle 28.

Figure 2:
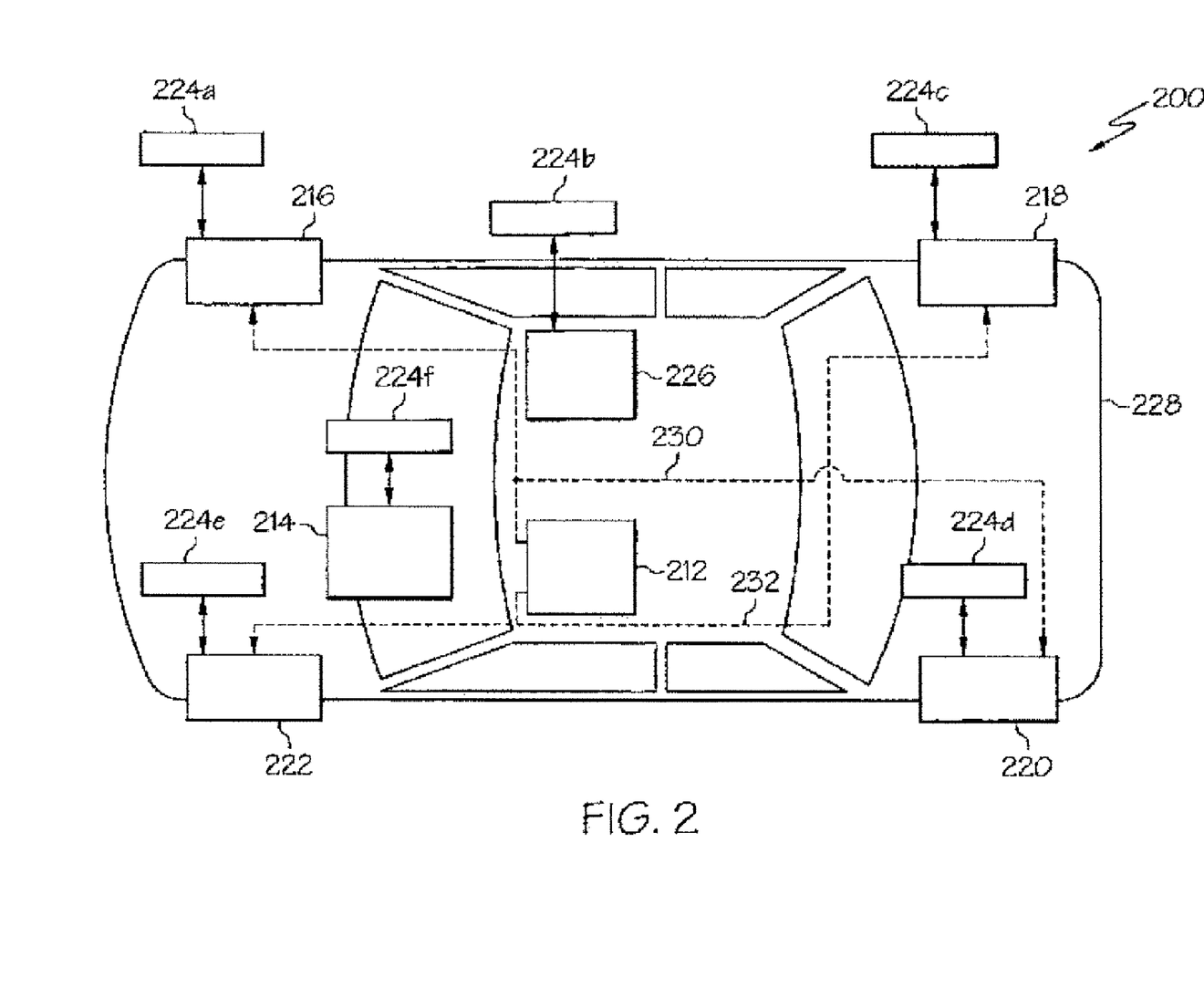
FIG. 2 is a schematic illustration of a first alternative aspect of the disclosed extreme emergency brake system.

Referring to FIG. 2, a second aspect of the disclosed extreme emergency brake system, generally designated 200, may include an electric park brake switch 212, a pedal feel emulator 214, four brake modules 216 (i.e., right-front), 218 (i.e., right-rear), 220 (i.e., left-rear), 222 (i.e., left-front), a communication bus 224a, 224b, 224c, 224d, 224e, 224f (collectively, 224) and a vehicle dynamic module 226. The system 200 may be embodied on a vehicle 228, such as a passenger car, a truck or the like. The electric park brake switch 212 may be connected to the right-front brake module 216 and the left-rear brake module 220 by communication line 230 and the left-front brake module 222 and the right-rear brake module 218 by communication line 232, wherein the communication lines 230, 232 may be hard-wired communications lines, wireless communications lines or the like.

Thus, according to the system 200, in the nominal mode, the pedal feel emulator 214 may communicate the user's brake commands to one or more of the brake modules 216, 218, 220, 222 by way of the communication bus 224. In the park brake mode, the user may actuate the electric park brake switch 212 such that the user's command is communicated directly to the right-front brake module 216 and the left-rear brake module 220 by communication line 230 and the left-front brake module 222 and the right-rear brake module 218 by communication line 232. Furthermore, due to the independence of the nominal mode and the park brake mode, in the event of a failure in the nominal mode, four-wheel extreme emergency braking may be achieved by way of the electric park brake switch 212.

Figure 3:
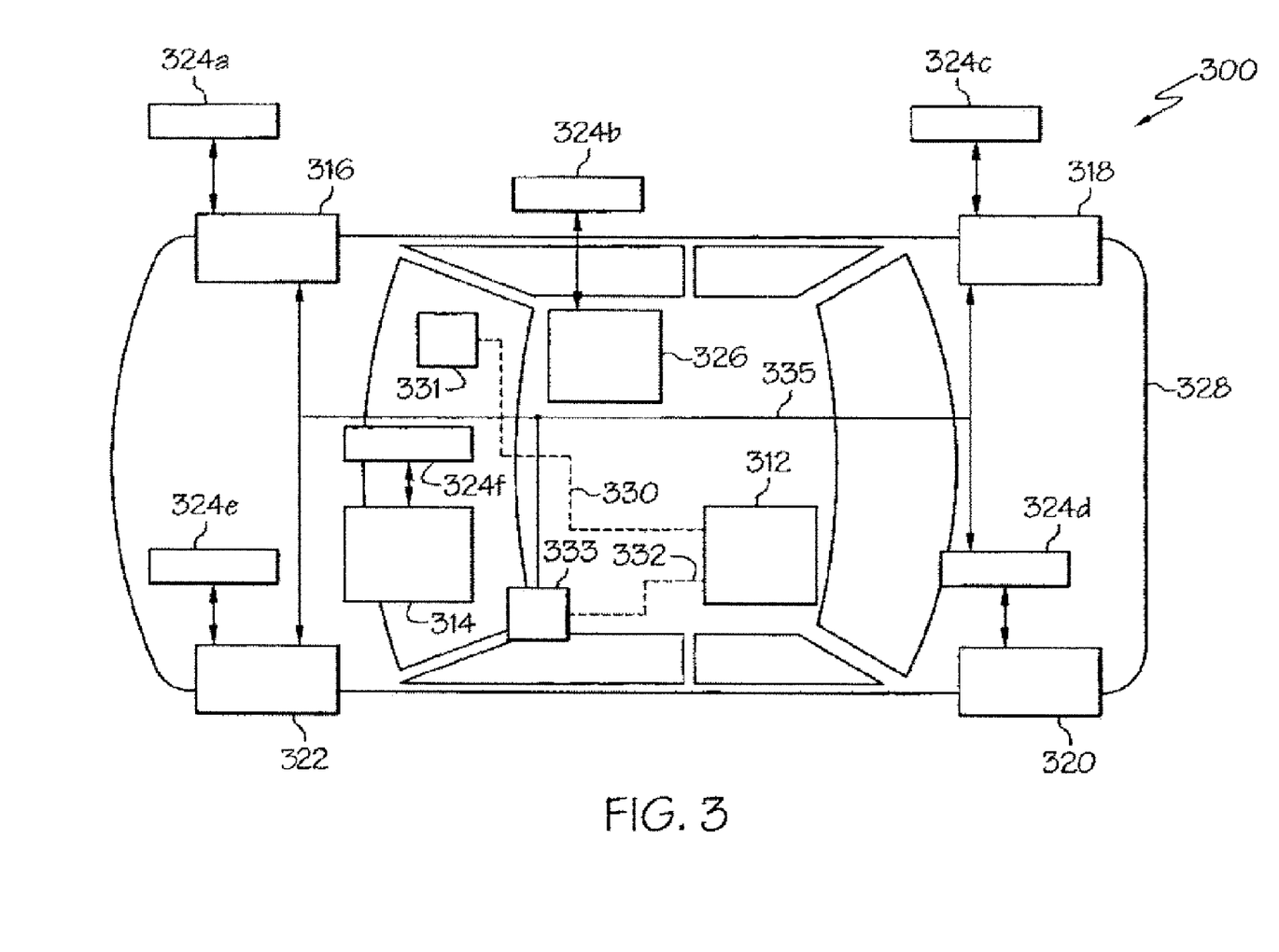
FIG. 3 is a schematic illustration of a second alternative aspect of the disclosed extreme emergency brake system.

Referring to FIG. 3, a third aspect of the disclosed extreme emergency brake system, generally designated 300, may include an electric park brake switch 312, a pedal feel emulator 314, four brake modules 316 (i.e., right-front), 318 (i.e., right-rear), 320 (i.e., left-rear), 322 (i.e., left-front), a communication bus 324a, 324b, 324c, 324d, 324e, 324f (collectively, 324), a first electronic control unit 331, a second electronic control unit 333 and a vehicle dynamic module 326. The system 300 may be embodied on a vehicle 328, such as a passenger car, a truck or the like.

In one aspect, the first and second electronic control units 331, 333 may be electronic control units associated with various systems of the vehicle 328, such as the vehicles power management unit, body controller or engine control unit. In another aspect, the first and second electronic control units 331, 333 may be a single unit and/or may only be used in connection with the disclosed system 300.

The electric park brake switch 312 may be connected to the first electronic control unit 331 by communication line 330 and the second electronic control unit 333 by communication line 332. In turn the first and second electronic control units 331, 333 may be connected to a communication bus 335, which may be an event-triggered communication bus or the like, such as a controller area network (CAN) communication bus of the vehicle 328. Therefore, a user's park brake input may be communicated from the electric park brake switch 312 to one or more of the brake modules 316, 318, 320, 322 by way of the electronic control units 331, 333 and the communication bus 335.

Thus, according to the system 300, in the nominal mode, the pedal feel emulator 314 may communicate the user's brake commands to one or more of the brake modules 316, 318, 320, 322 by way of the communication bus 324. In the park brake mode, the user may actuate the electric park brake switch 312 such that the user's command is communicated directly to one or more of the brake modules 316, 318, 320, 322 by way of the communication bus 335. Furthermore, due to the independence of the nominal mode and the park brake mode, in the event of a failure in the nominal mode, extreme emergency braking at one or more of the brake modules 316, 318, 320, 322 may be achieved by way of the electric park brake switch 312.

At this point, those skilled in the art will appreciate that independence of the nominal and park brake modes may be achieved by using different sensors and communication paths for each system. Furthermore, those skilled in the art will appreciate that greater independence may be achieved by using different technologies for the different communication paths (e.g., a time-triggered communication bus for the nominal braking system and a hard-wired or event-triggered communication bus for the park/emergency braking system).

Although various aspects of the disclosed extreme emergency brake system have been shown and described, modifications may occur to those skilled in the art upon reading the specification. The present application includes such modifications and is limited only by the scope of the claims.

What is claimed is:

1. An extreme emergency braking system comprising:
   at least two brake modules;
   a pedal feel emulator in communication with at least one of said brake modules by way of a first communication line;
   an electric park brake switch assembly in communication with said brake modules by at least a second communication line; and
   a fault detecting electric circuit adapted to supply at least a first voltage to a first one of said brake modules and a second voltage to a second one of said brake modules, said supplied voltages being indicative of a state of said electric park brake switch assembly and said associated second communication line,
   wherein said first communication line is independent of said second communication line.

2. The system of claim 1 wherein said switch assembly includes at least two switches, each of said switches being associated with a corresponding one of said brake modules.

3. The system of claim 1 wherein said brake modules are mounted on a vehicle.

4. The system of claim 1 wherein said pedal feel emulator is in communication with each of said brake modules.

5. The system of claim 1 wherein said electric park brake switch assembly is in communication with said first one of said brake modules by said second communication line and said second of said brake modules by a third communication line.

6. The system of claim 5 wherein said electrical park brake switch assembly is in communication with a front right brake module by said second communication line and a front left brake module by said third communication line.

7. The system of claim 5 wherein said electrical park brake switch assembly is in communication with a front right brake module and a left rear brake module by said second communication line and a front left brake module and a right rear brake module by said third communication line.

8. The system of claim 5 wherein said electrical park brake switch assembly is in communication with a front right brake module and a front left brake module by said second communication line and a left rear brake module and a right rear brake module by said third communication line.

9. The system of claim 5 wherein said fault detecting electric circuit is adapted to supply two voltages based upon a state of said electric park brake switch assembly and said second and third communication line.

10. The system of claim 5 wherein said second and third communication lines are hard-wired communication lines.

11. The system of claim 5 wherein said second and third communication lines are composed of hard-wired communication lines connected to at least two electronic modules and said electronic modules are connected to a second communication bus.

12. The system of claim 11 wherein said second communication bus is an event-triggered communication bus.

13. The system of claim 1 wherein each of said brake modules is an electric caliper.

14. The system of claim 1 wherein each of said brake modules is an electro-hydraulic brake unit.

15. The system of claim 1 wherein said pedal feel emulator is a brake pedal.

16. The system of claim 15 wherein said brake pedal includes at least one sensor adapted to detect a braking command.

17. The system of claim 1 wherein said first communication line is a first communication bus.

18. The system of claim 17 wherein said communication bus is a time-triggered communication bus.

19. The system of claim 1 wherein said fault detecting electric circuit includes two switches.

20. The system of claim 1 further comprising a vehicle dynamic module in communication with said pedal feel emulator.

21. The system of claim 1 wherein said first communication line is a time-triggered communication bus and said second communication line is a hard-wired communication line.

22. The system of claim 1 wherein said system is adapted to detect a fault in said electrical park brake switch assembly and said associated second communication line.

23. The system of claim 1 wherein said electrical park brake switch assembly provides a consistent park brake command to each of said brake modules connected thereto.

24. The system of claim 1 wherein at least one additional switch is integrated in said brake modules to test said electrical park brake switch assembly and said second communication line by introducing known errors during a testing phase.

* * * * *